US012727706B2

(12) United States Patent
Kaptelinin

(10) Patent No.: US 12,727,706 B2
(45) Date of Patent: Sep. 8, 2026

(54) BEVERAGE MAKING APPARATUS

(71) Applicant: Viktor Kaptelinin, Hornefors (SE)

(72) Inventor: Viktor Kaptelinin, Hornefors (SE)

( * ) Notice: Subject to any disclaimer, the term of this patent is extended or adjusted under 35 U.S.C. 154(b) by 638 days.

(21) Appl. No.: 17/976,829

(22) Filed: Oct. 30, 2022

(65) Prior Publication Data

US 2023/0052261 A1 Feb. 16, 2023

Related U.S. Application Data

(63) Continuation-in-part of application No. 16/892,841, filed on Jun. 4, 2020, now abandoned.

(60) Provisional application No. 63/273,931, filed on Oct. 30, 2021, provisional application No. 62/857,140, filed on Jun. 4, 2019.

(51) Int. Cl.
*A47J 31/20* (2006.01)
*A47J 31/06* (2006.01)

(52) U.S. Cl.
CPC ........... *A47J 31/20* (2013.01); *A47J 31/0636* (2013.01)

(58) Field of Classification Search
CPC .... A47J 31/20; A47J 31/0615; A47J 31/0636; A47J 31/4407; A47J 31/4482
See application file for complete search history.

(56) References Cited

U.S. PATENT DOCUMENTS 1,246,399 A 11/1917 Dixon
2,099,996 A * 11/1937 Beling .................. A47G 19/16 99/318
2,625,299 A * 1/1953 Uhlig .................... B44D 3/123 220/736
2,699,882 A * 1/1955 Lieb ...................... B44D 3/123 220/699
3,657,994 A 4/1972 Post
3,948,413 A * 4/1976 Gorrell ................. B44D 3/123 15/257.05
4,275,818 A * 6/1981 Church ................. B44D 3/123 15/257.05
4,295,619 A * 10/1981 Kulin .................. A61G 7/0503 248/318

(Continued)

FOREIGN PATENT DOCUMENTS

WO WO2008078110 * 7/2008

*Primary Examiner* — Kevin R Kruer

(57) ABSTRACT

An apparatus is provided for making beverages by immersing an infusible material, such as loose tea-leaves, in a liquid, such as hot water. The apparatus comprises a liquid-impermeable beverage container, and an infuser container, which can be inserted to, or extracted from the beverage container. The infuser container is liquid-permeable, while being impermeable to the infusible material. According to the invention, the infuser container, containing infusible material and being immersed in the liquid contained in the beverage container, may be extracted from the beverage container after a desirable length of time and securely placed above the liquid in an elevated tilted position, in which position the liquid remaining in the infuser container drips back to the beverage container. According to some embodiments of the invention, the placement and orientation of the infuser container, as well as a secure attachment of the infuser container to the beverage container, make it possible for the user to pour liquid from the beverage container without removing the infuser container from the beverage container.

5 Claims, 14 Drawing Sheets

(56) References Cited

U.S. PATENT DOCUMENTS 4,377,239 A * 3/1983 Jimae ..................... B44D 3/123 211/94.01
4,821,630 A * 4/1989 Roberts .................. A47G 19/14 426/77
5,033,704 A * 7/1991 Kerr ....................... B44D 3/123 248/213.2
5,375,736 A * 12/1994 Gonzalez ............... B44D 3/123 220/700
5,609,092 A * 3/1997 Chen ................... A47J 31/0636 99/322
6,168,816 B1 * 1/2001 Hammond ............. B65D 51/24 426/77
6,276,262 B1 * 8/2001 Chen ......................... A23F 3/18 99/322
6,405,638 B1 6/2002 Chen
6,655,261 B1 * 12/2003 Horstmann ............. A47J 31/18 99/323.3
7,219,600 B1 * 5/2007 Haven ..................... A47J 31/20 99/322
8,967,038 B2 * 3/2015 Rivera ............... B65D 85/8061 99/295
9,771,194 B1 * 9/2017 Lefkovitz .......... A47G 19/2205
9,801,493 B2 * 10/2017 Bebo ....................... A47J 31/20
10,743,557 B2 * 8/2020 Hampton ............. A23C 11/103
2001/0013518 A1 * 8/2001 Lallement .............. B44D 3/126 220/570
2004/0173627 A1 * 9/2004 Kesling .................. B44D 3/123 220/756
2005/0145757 A1 * 7/2005 Brown ................... A46B 17/02 248/213.2
2005/0284303 A1 * 12/2005 Zell ...................... A47J 41/0011 99/279
2007/0119854 A1 * 5/2007 Rittmann ............... B44D 3/121 220/570
2008/0035650 A1 * 2/2008 Rittmann ............... B44D 3/128 220/570
2008/0060526 A1 * 3/2008 Gilbert .................... A47J 31/20 99/289 D
2008/0173184 A1 * 7/2008 Chang ..................... A47J 31/14 99/298
2010/0263549 A1 * 10/2010 Lee ......................... A47J 31/18 99/319
2013/0189412 A1 * 7/2013 Peasley ................. B65B 29/028 206/0.5
2015/0164261 A1 * 6/2015 Fukumura ............... A47J 31/18 99/323
2016/0296062 A1 10/2016 Gross
2017/0172339 A1 * 6/2017 De Loynes ............ A47G 19/16
2017/0318999 A1 * 11/2017 Han .................... A47J 31/4478
2018/0077945 A1 * 3/2018 Hampton ............. A23C 11/103
2018/0255958 A1 9/2018 Van Voorhis
2020/0383514 A1 * 12/2020 Kaptelinin .......... A47J 31/0636
2021/0378437 A1 * 12/2021 Morse ................ A47J 31/0626

* cited by examiner 185
188
188
188

BEVERAGE MAKING APPARATUS

CROSS-REFERENCE TO RELATED APPLICATIONS

The present application is a continuation-in-part of U.S. patent application Ser. No. 16/892,841, filed Jun. 4, 2020, with title "APPARATUS AND METHOD FOR PREPARING A BEVERAGE" and naming Viktor Kaptelinin as inventor, which claims the benefit of provisional U.S. Patent Application Ser. No. 62/857,140, filed Jun. 4, 2019 with title "APPARATUS FOR PREPARING A BEVERAGE" and naming Viktor Kaptelinin as inventor. The present invention also claims the benefit of provisional U.S. Patent Application Ser. No. 63/273,931, filed Oct. 30, 2021, with title "APPARATUS AND METHOD FOR PREPARING A BEVERAGE" and naming Viktor Kaptelinin as inventor. All of the foregoing applications are hereby incorporated herein by reference in their entirety.

FEDERALLY SPONSORED RESEARCH

Not Applicable

FIELD

The invention generally relates to the field of devices for making beverages by infusing infusible materials in liquids.

BACKGROUND

A common way of making beverages, such as tea or coffee, is infusing an infusible material in liquid. The infusion process is also referred to as "steeping", "extracting", or "brewing". Infusible materials commonly used for making beverages include dried tea-leaves, herbs, dried berries, ground coffee, and so forth. The most commonly used liquid is hot water, but other liquids, such as milk, can also be used.

One type of infusion devices, known in prior art, are devices that comprise two essential parts, a beverage container and a removable infuser container. Additional parts and elements, such as lids, handles, nozzles, stands, and so forth, may also be added for convenience, safety, efficiency, or decorative purposes.

Users of infusion devices of the above type may experience problems when removing an infuser container from a beverage container. For instance, the liquid, absorbed by infusible materials, may drip from the infuser container for a relatively prolonged period of time and it may be difficult to find a place to store the infuser container when it is removed from the beverage container. These problems are addressed in the present application.

SUMMARY OF THE INVENTION

An infuser apparatus for preparing beverages is provided for increased user comfort and efficiency. The apparatus according to the present invention comprises a liquid-impermeable beverage container having a top opening, and an infuser container (or "infuser"), containing infusible materials. The infuser container is at least partly liquid-permeable whereas impermeable to the infusible material. The infuser container can be substantially directly, that is, without the need to adjust or reassemble the parts comprising either the beverage container or the infuser container, inserted to the beverage container, or extracted from the beverage container, through the top opening of the beverage container.

The apparatus is configured to permit the infuser container to selectively assume at least two stationary (or "stable") positions relative to the beverage container, a lower stationary position and a higher stationary position, in which positions the infuser container may remain stationary without the need for the user to hold or support the infuser container. In the lower stationary position, the infuser container is inserted lower in the beverage container to permit the infusible materials, contained in the infuser container, to be submerged in the liquid contained in the beverage container, and therefore enable the process of infusion. In the higher stationary position, the infuser container, containing infusible materials, is located substantially above the level of the liquid contained in the beverage container. Therefore, when the user wants to stop the process of infusion, the user does not need to remove the infuser container from the beverage container and place it somewhere else. Instead, the user simply places the infuser container in the higher stationary position. In addition, the user does not need to be concerned about the beverage dripping from the infuser container when the container is extracted from the beverage container, since the beverage drips back to the beverage container. Moreover, according to some embodiments of the invention the apparatus is configured to enable the infuser container to be securely attached to the beverage container when the user tilts the beverage container, so the user can pour the prepared beverage without removing the infuser container.

BRIEF DESCRIPTION OF THE FIGURES

FIG. 10*c*: shows an apparatus according to the third embodiment of the present invention with an infuser container being in the higher stationary position.

DETAILED DESCRIPTION OF THE INVENTION

FIGS. 1-10 illustrate preferred embodiments of the invention. The embodiments comprise at least two containers, a beverage container, in which the desired beverage is prepared, and a detachable and movable infuser container, which may be inserted in the beverage container through a top opening of the beverage container. The beverage container is liquid-impermeable comprising at least walls and a bottom and having a top opening through which the infuser container can be inserted. The beverage container can be made of metal, glass, plastic, porcelain, clay, or other liquid-impermeable materials or their combinations. The infuser container is impermeable to the infusible material and at least partly liquid-permeable (for instance, by comprising perforation holes or employing metal mesh, plastic mesh, or fabrics). It has a top opening. In accordance with the present invention the infuser container can be placed in one of two different stationary positions relative to the beverage container, a lower stationary position, and a second higher stationary position. In the lower stationary position, the bottom of the infuser container is located lower than said bottom is located the higher stationary position. In each of these stationary positions the apparatus is stable under normal use conditions, when the apparatus is placed on a substantially horizontal stable flat surface, and does not require user-actions to maintain a stable position.

A beverage container and an infuser container according to the first embodiment are configured to permit a vertically oriented infuser container to be inserted, typically by moving it downwards, into the beverage container to assume a lower stationary position. In the lower stationary position, similar to the position of infuser containers in conventional infuser teapots, the infuser container is substantially vertically oriented, with its top opening being above its bottom, being inserted into the beverage container to substantially the maximum possible length of the infuser container.

The beverage container and the infuser container are also configured to support placing the infuser container in a higher stationary position, in which position the infuser container assumes an elevated stationary position in which the bottom of the infuser container is located higher than the bottom is located in the lower stationary position, and the bottom is located substantially above the top opening of the beverage container. According to the present invention, the beverage container and the infuser container are configured so that in the higher stationary position the infuser container is tilted: the infuser container is not vertically oriented, as it is oriented in the lower stationary position. Instead, it is rotated about a horizontal axis orthogonal to the central longitudinal axis of the infuser container.

Figures 1A, 1B, 1C:
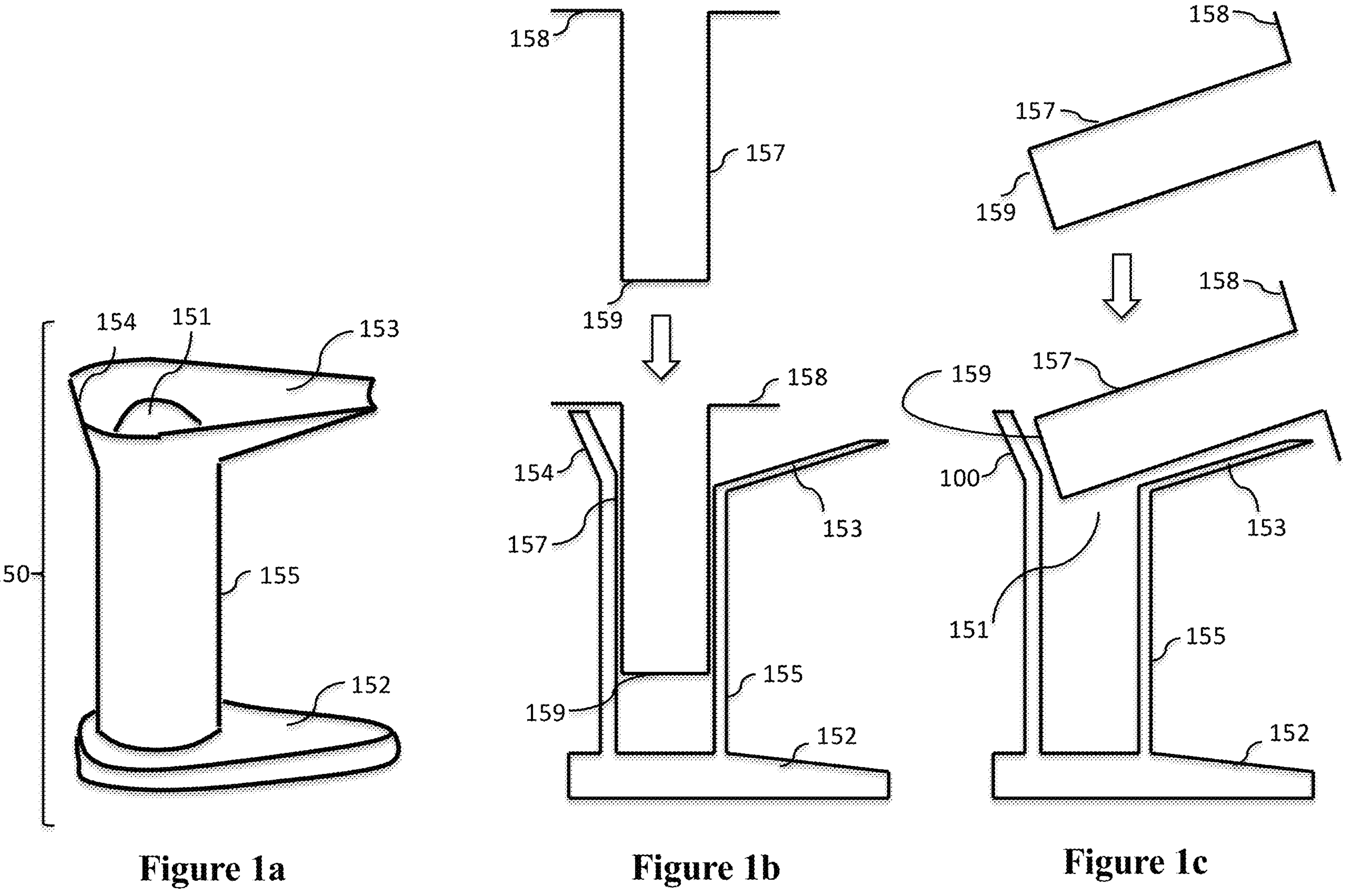
FIG. 1*a*: shows a beverage container according to the first embodiment of the present invention.
FIG. 1*b*: shows an infuser container being placed in the lower stationary position according to the first embodiment of the present invention.
FIG. 1*c*: shows an infuser container being placed in the higher stationary position according to the first embodiment of the present invention.
Figures 2A, 2B, 2C:
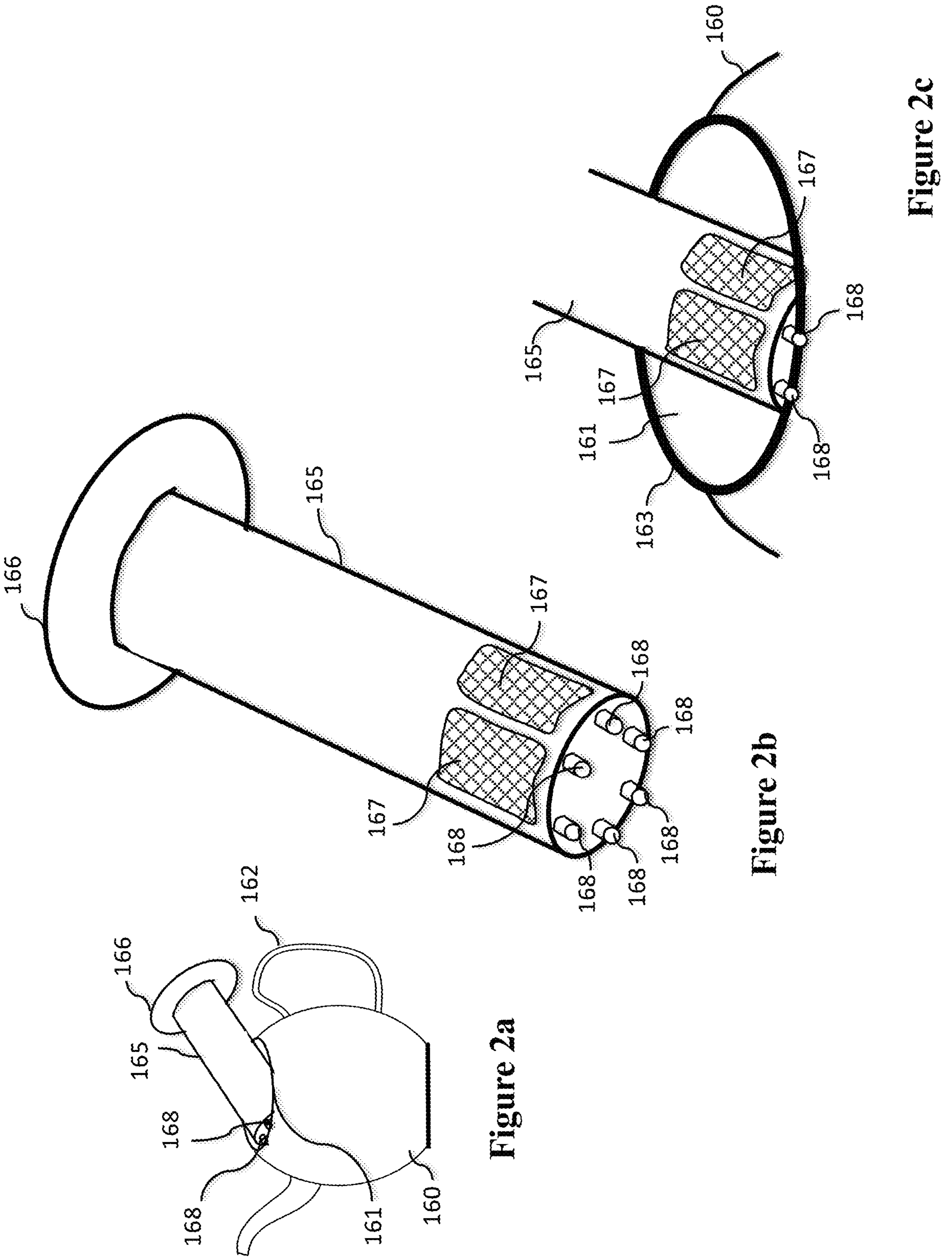
FIGS. 2*a*, 2*b*, and 2*c*: show a variation of the first embodiment of the present invention.

The first embodiment is illustrated by FIG. 1-FIG. 2. A device shown in FIG. 1 comprises an infuser container 157 and a beverage container 150. Infuser container 157 is an open top container made of glass and having a substantially cylindrical shape, comprising bottom 159 and flange 158, which flange is extending from a top part of infuser container 157. A plurality of holes around bottom 159 is provided (not shown). Beverage container 150 comprises three integrated sections: lower section 152 configured as a support member for increased stability of the device, substantially cylindrical middle section 155 providing space for containing liquid, section 152 housing infuser container 157 in the lower stationary position, and a top section, which top section comprises a multitude of means for supporting infuser container 157 in a tilted higher stationary position. In the higher stationary position infuser container 157 is tilted as a certain angle (that is, rotated so that its central longitudinal axis is oriented at an angle to a vertical axis). The multitude of supporting members includes the following means: an extended preferably concave member 153, which forms a slide for supporting infuser container 157 and can also serve as a nozzle, flattened wall area 154 located at substantially the same level as concave member 153 on the opposite side of inside perimeter 151 of beverage container 150, and flange 158. When infuser container 157 is in the higher stationary position, flange 158 presses against concave member 153 to prevent infuser container 157 from sliding lower relative to beverage container 150.

When using the device shown in FIG. 1, the user first places a vertically oriented infuser container 157, infusible material (not shown) contained in infuser container 157, and liquid (not shown) in beverage container 150. Infuser container 157 assumes a lower stationary position and the infusible material is at least partly covered by the liquid. The user allows the infusible material to be infused in the liquid for a desired length of time, and then lifts up infuser container 157, tilts container 157, and places container 157 at a top part of beverage container 150, so that container 157 is supported in a tilted position by one or several supporting means selected from a group comprising concave member 153, wall area 154, and flange 158. The liquid dripping from container 157 flows to beverage container 150. After a desired length of time, when the dripping ends or is sufficiently reduced, the user removes container 157 with the used infusible material, and uses the newly prepared beverage contained in beverage container 150. An additional support means according to the first embodiment is illustrated by FIG. 2. that shows a variation of a beverage-making device according to the first embodiment. Beverage container 160 has a top opening 161 and handle 162. Infuser container 165 is implemented as an open-top metal cylinder. Parts 167 of infuser container 165 are made of metal mesh. Flange 166 extends from the top opening of container 165. Container 165 has six bottom protrusions 168. Protrusions 168 are adapted to keep container 165 in a stationary upright position when container 165 is placed on a horizontal surface. When container 165 is vertically inserted in opening 161, container 165 assumes the higher stationary position (not shown), similar to the higher stationary position depicted, for instance, in FIG. 4. When container 165 is partly removed from beverage container 160 and tilted by manually placing container 165 at an angle to the vertical axis, some of protrusions 168 extend beyond rim 163 of opening 161, press against rim 163, and in conjunction with a part of rim 163, which part is substantially opposite to the part of rim 163 contacted by protrusions 168, provide a support means for supporting infuser container 165 in the tilted position. The support means ensure a stable elevated tilted second higher stationary position of infuser container 165 sitting on beverage container 160.

To use the device shown in FIG. 2 the user first places in beverage container 160 the following: vertically oriented infuser container 165, infusible material (not shown) contained in infuser container 165, and liquid (not shown). Infuser container 165 assumes a lower stationary position and the infusible material is at least partly covered by the liquid. The user allows the infusible material to be infused in the liquid for a desired length of time, and then lifts up infuser container 165, tilts container 165, and places container 165 at a top part of beverage container 160, so that container 165 is supported in a tilted position by at least one protrusion 168 and the rim of opening 161. Infuser container 165 is placed so that at least one protrusion 168 extends from bottom of infuser container 165 beyond the rim of opening 161 and rests on the rim of opening 161, preventing infuser container 165 from slipping into opening 161. The liquid dripping from container 165 flows to beverage container 160. After a desired length of time, when the dripping ends or is sufficiently reduced, the user removes container 165 with the used infusible material from beverage container 160, and uses the newly prepared beverage contained in beverage container 160.

Therefore, according to the first embodiment, by tilting the infuser container, that is, rotating the infuser container about a horizontal axis orthogonal to the central longitudinal axis of the infuser container; the user may place the infuser container in a tilted elevated higher stationary position, in which position the infuser container sits on the beverage container and is supported by said beverage container. A plurality of supporting means is provided to support the infuser container in a tilted elevated higher stationary position.

The beverage container comprises a preferably concave support member extending from a top part of the beverage container, and the support member is adapted to be capable to support the tilted infuser container in the higher stationary position. A part of a wall of the beverage container, located substantially opposite the support member in the higher stationary position, is adapted to receive and support a bottom of the infuser container.

The support means described in FIG. 1 and FIG. 2 can be used in various combinations. For instance, a concave support member, similar to support member 153 shown in FIG. 1, can be used in combination with bottom protrusions, similar to protrusions 168 shown in FIG. 2.

Figures 3, 4:
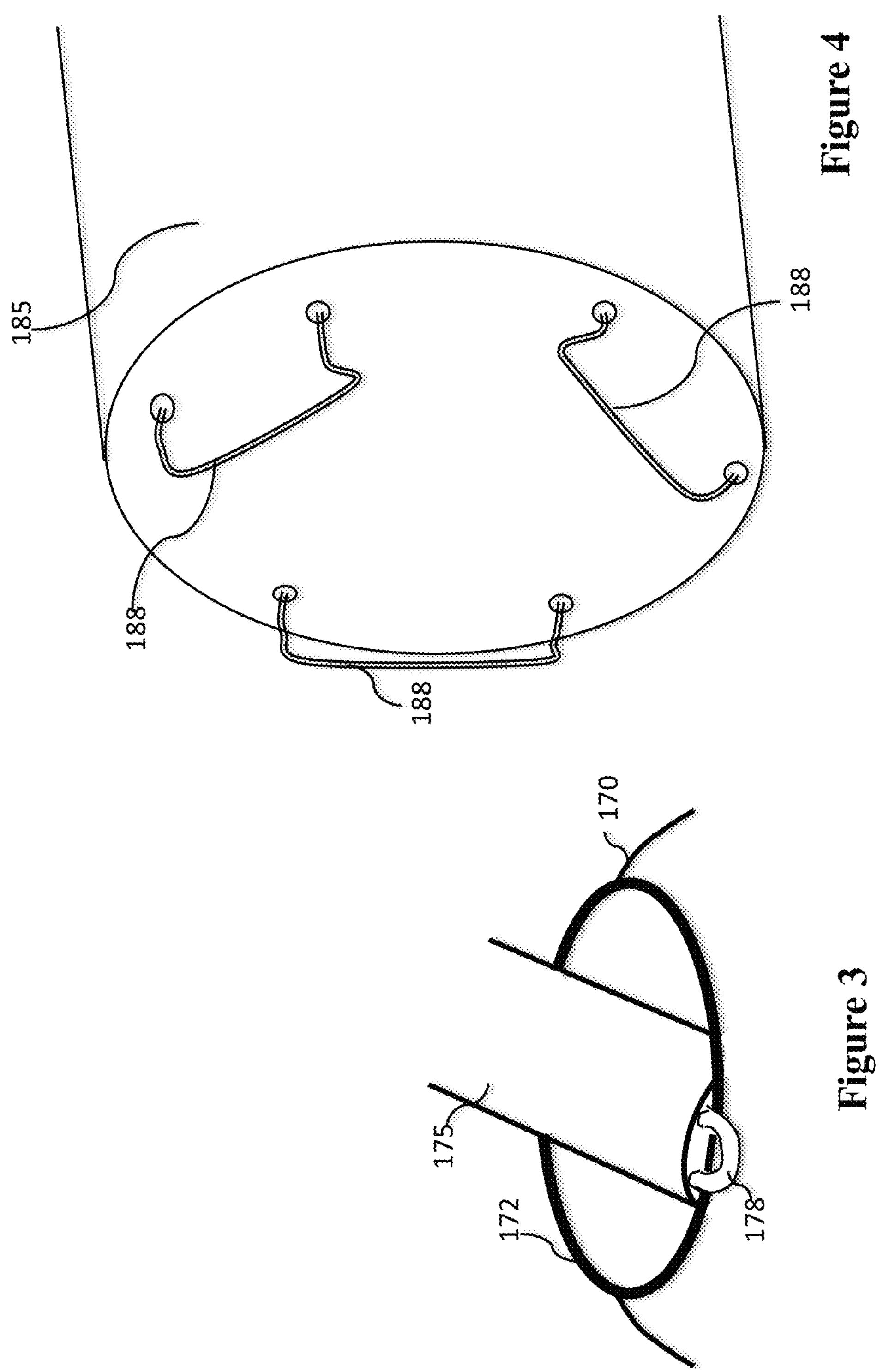
FIG. 3: shows a variation of the first embodiment of the present invention.
FIG. 4: shows a variation of the first embodiment of the present invention.

Various shapes of bottom protrusions holding an infuser container in a tilted position, partly immersed in a beverage container, can be employed. For instance, FIG. 3 and FIG. 4 show bottom protrusions implemented as braces, either straight braces 178 (FIG. 3) or bent braces 188 (FIG. 4), which braces are bent inward to serve as hooks and provide better engagement with the rim of the opening of the beverage container, and also for achieving a more stable upright position on a horizontal surface. It is appreciated that bottom protrusions according to the embodiment can have various other shapes and may not be directly attached to the bottom of the infuser container, but rather generally connected to a lower part of the infuser container.

In addition, various means can be used to support the infuser container in the lower stationary position. For instance, in the lower stationary position a top flange of an infuser container may rest on the rim of a top opening of a beverage container; or an infuser container can be long enough to be inserted into a beverage container for the full height of the beverage container, so that the bottom of the infuser container rests on the bottom of the beverage container.

Figure 5:
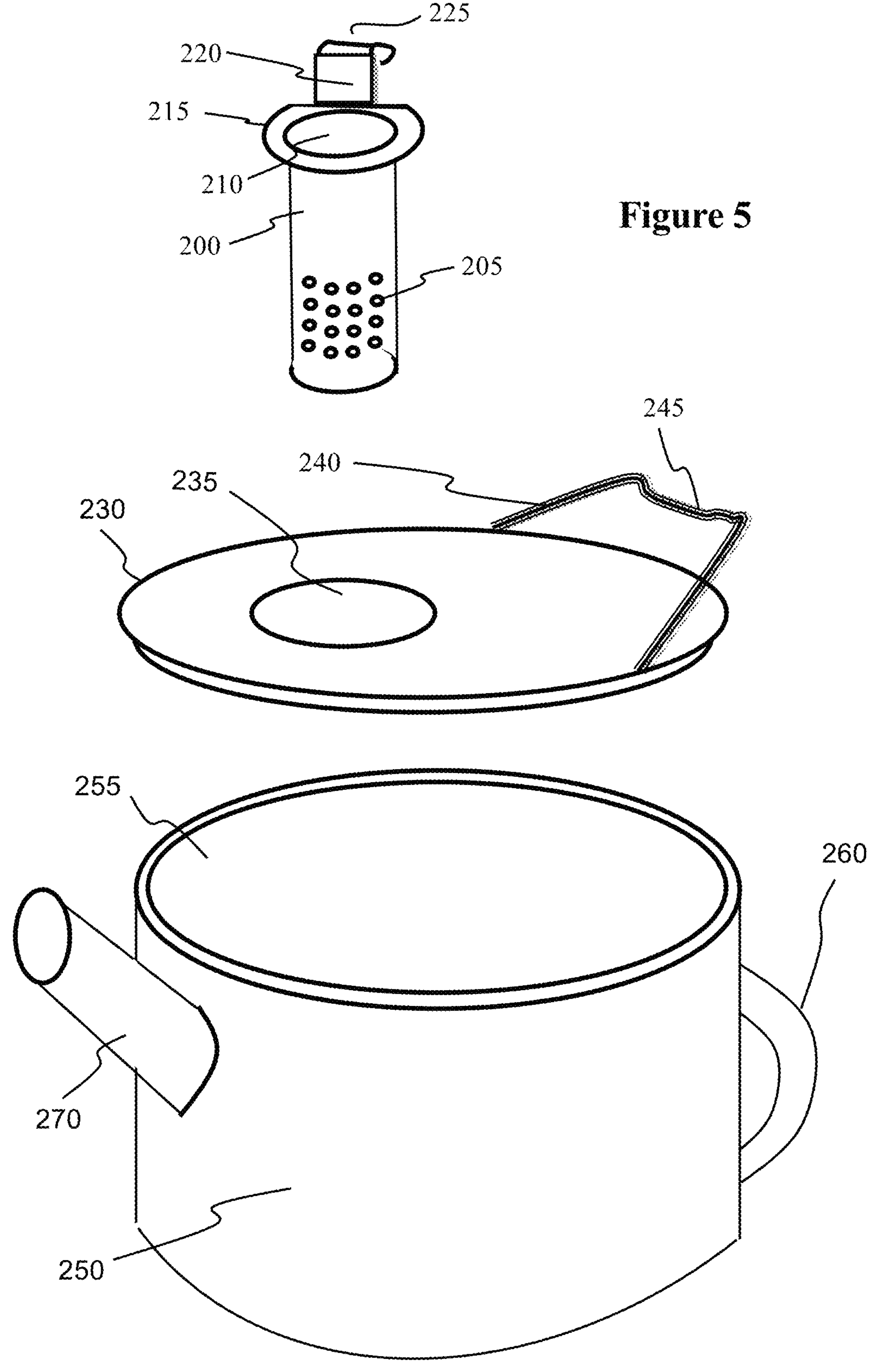
FIG. 5: shows main component parts of an apparatus according to the second embodiment of the present invention.

FIGS. 5-7 show the second preferred embodiment of the invention. Unless specifically noted, spatial orientation references, such as "vertical", "higher", "lower", "top", and "bottom", are made assuming that the apparatus is in an upright position, placed on a substantially horizontal flat surface. An apparatus according to the embodiment comprises two main parts (see FIG. 5): (a) infuser 200 and (b) a beverage container comprising two parts, lid (also referred to as a "cover part") 230, and base part (also referred to as a "base container") 250. The parts can be made of such materials as stainless steel, glass, porcelain, plastic, etc.

Clarification of terminology: The term "handle" as used herein when describing an infuser container refers to a projecting member that may be used for gripping by a user, but it may also serve structural or engagement functions independent of manual handling. As used herein, a 'member' may include one or more components, projections, or features that act together to provide the described function (e.g., support, retention, engagement).

Infuser container 200 is an open-top container, having a substantially cylindrical shape. Perforations 205 make infuser container 200 permeable to liquid but impermeable to the infusible materials, such as tea leaves, contained in infuser container 200. Flanges 215 are located near top opening 210 of infuser container 200. The flanges extend sideways from perimeter of opening 210, except for a part of the perimeter, where infuser container handle 220 is attached to a side of infuser container 200. Handle 220 is a short flat strip, for instance, made of stainless steel. Handle 220 comprises handle tip 225, which has a hook-like shape.

Cover part 230 is a lid, which is attached to the top of base part 250. Cover part 230 can be attached to base part 250, for instance, by snapping or twisting. Cover part 230 has opening 235, through which infuser container 200 can be inserted or extracted. Cover part 230 also comprises a support member 240. Support member 240 is adapted to support infuser container 200 in a tilted position substantially above base part 250. Support member 240 is an elevated extension of cover part 230, having a substantially "inverted U" shape, with a concave part 245 in the middle. Part 245 is configured to engage with handle tip 225 in a way, which enables infuser container 200 to assume a stable tilted suspended higher stationary position when infuser container 200 is hanging on support member 240.

Base part 250 is an open-top liquid-impermeable container. Base part 250 has top opening 255, handle 160, and nozzle/spout 270.

Figure 6A:
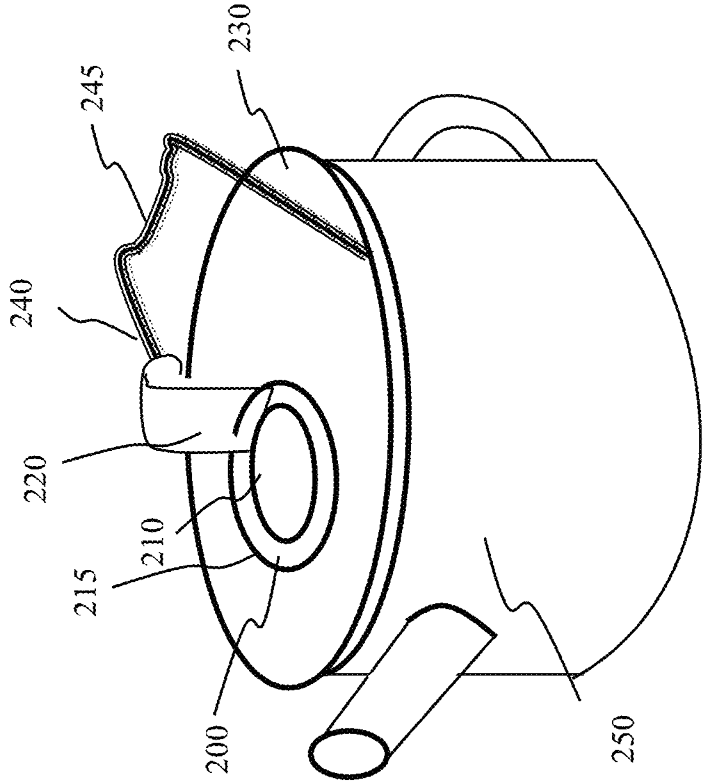
FIGS. 6*a* and 6*b*: show an apparatus according to the second embodiment of the present invention with an infuser container being in the lower stationary position.
Figure 6B:
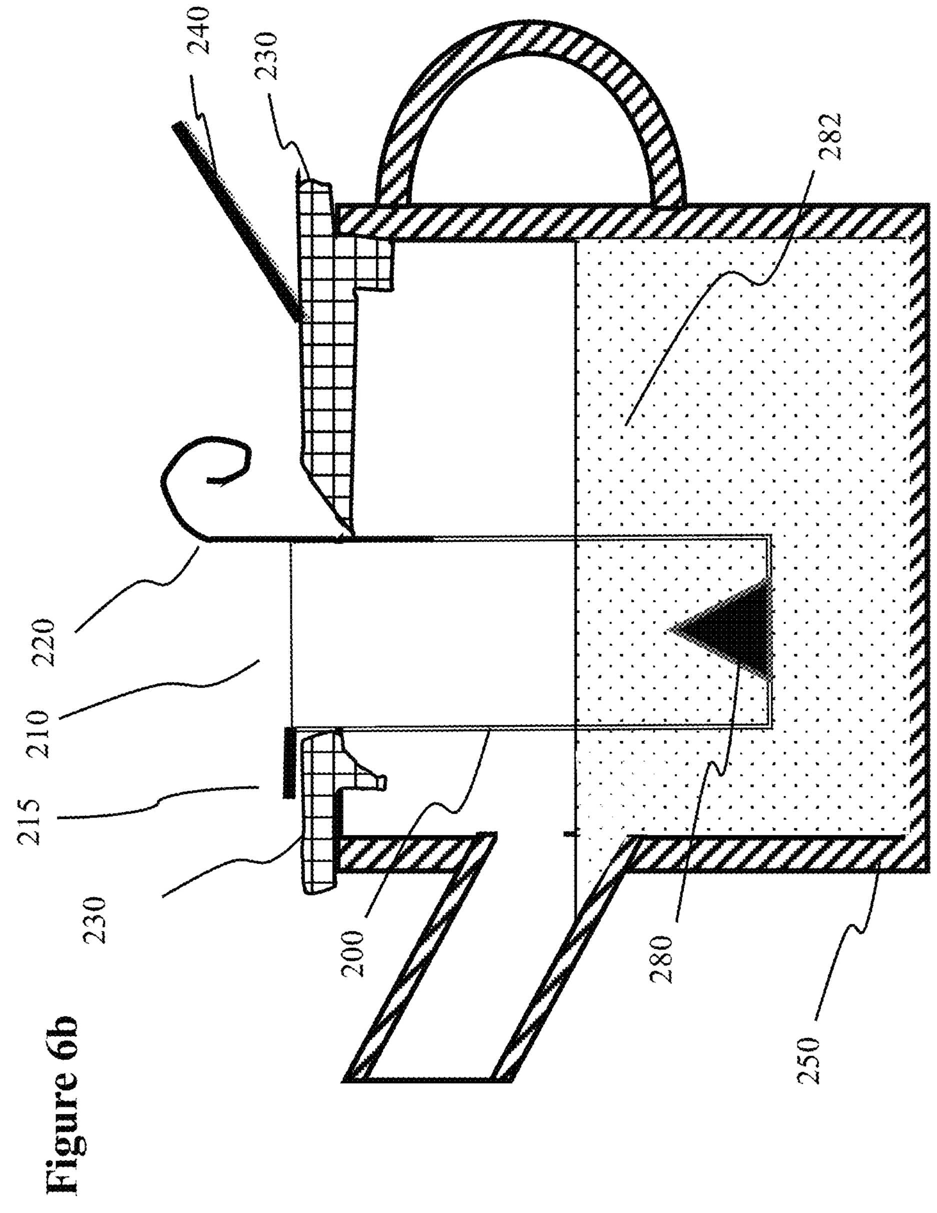

FIG. 6*a* and FIG. 6*b* show an apparatus according to the second preferred embodiment of the present invention, with infuser container 200 being placed in the lower stationary position. FIG. 6*a* is an oblique view of the apparatus, while FIG. 6*b* is a vertical cross section side view of the apparatus. Infuser 200 is inserted into base part 250 through opening in cover part 230. Infuser container handle 220 is protruding above cover part 230. Handle 220 is not engaged with concave part 245 of elevated support member 240. Flanges 215 support infuser container 200, which sits on cover part 230 and prevent infuser container 200 from moving lower into base part 250. Infuser container 200 is hanging above the bottom of base part 250, without touching the bottom. Infusible contents 280 can be placed into infuser container 200 through top opening 210 before or after inserting infuser container 200 into base part 250. Liquid 282 can be added to base part 250 before or after inserting infuser container 200 into base part 250. Since infuser container 200 is liquid-permeable, liquid 282, contained in base part 250, may enter infuser container 200. If enough liquid 282 is added to base part 250, infusible contents 280 are being submerged in the liquid and the infusion process is taking place.

Figure 7A:
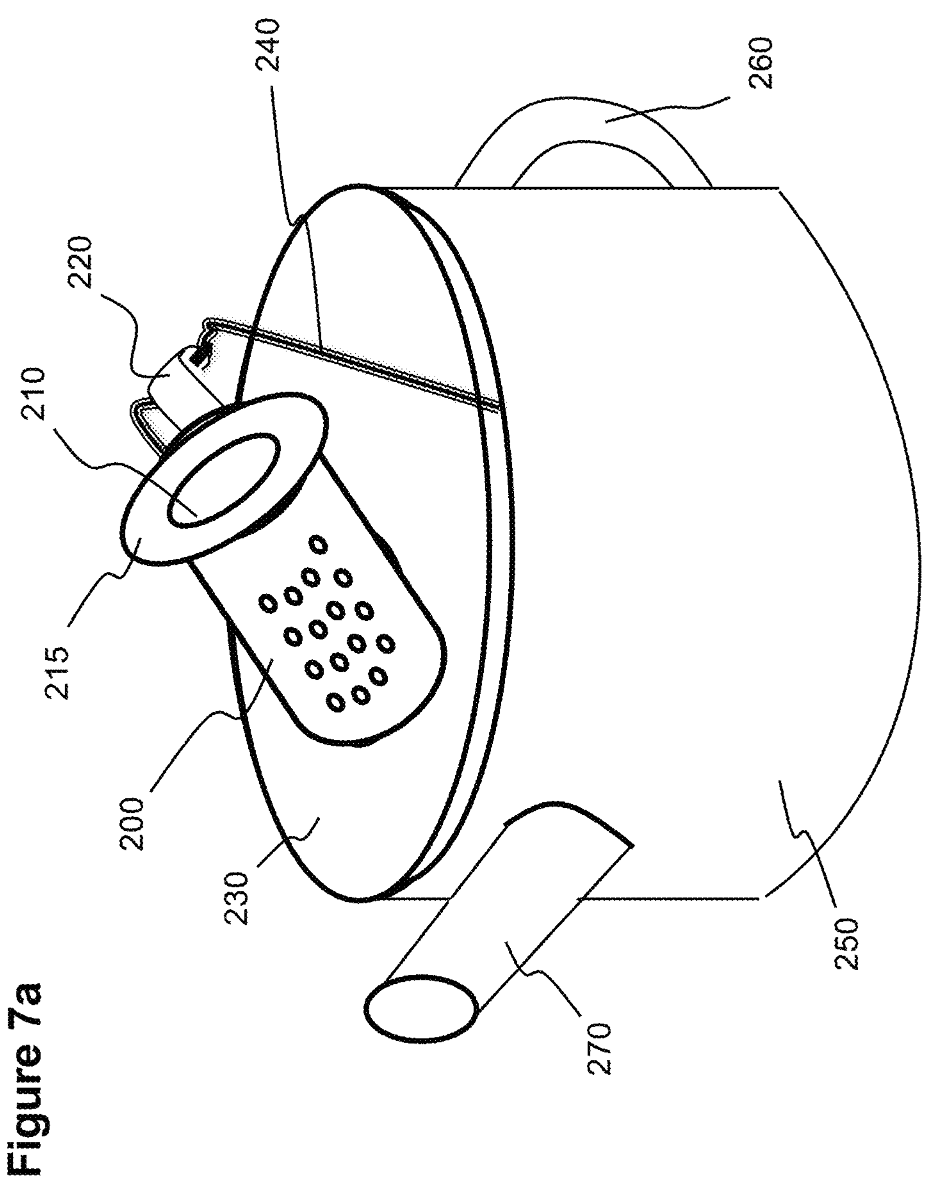
FIGS. 7*a* and 7*b*: show an apparatus according to the second embodiment of the present invention with an infuser container being in the higher stationary position.
Figure 7B:
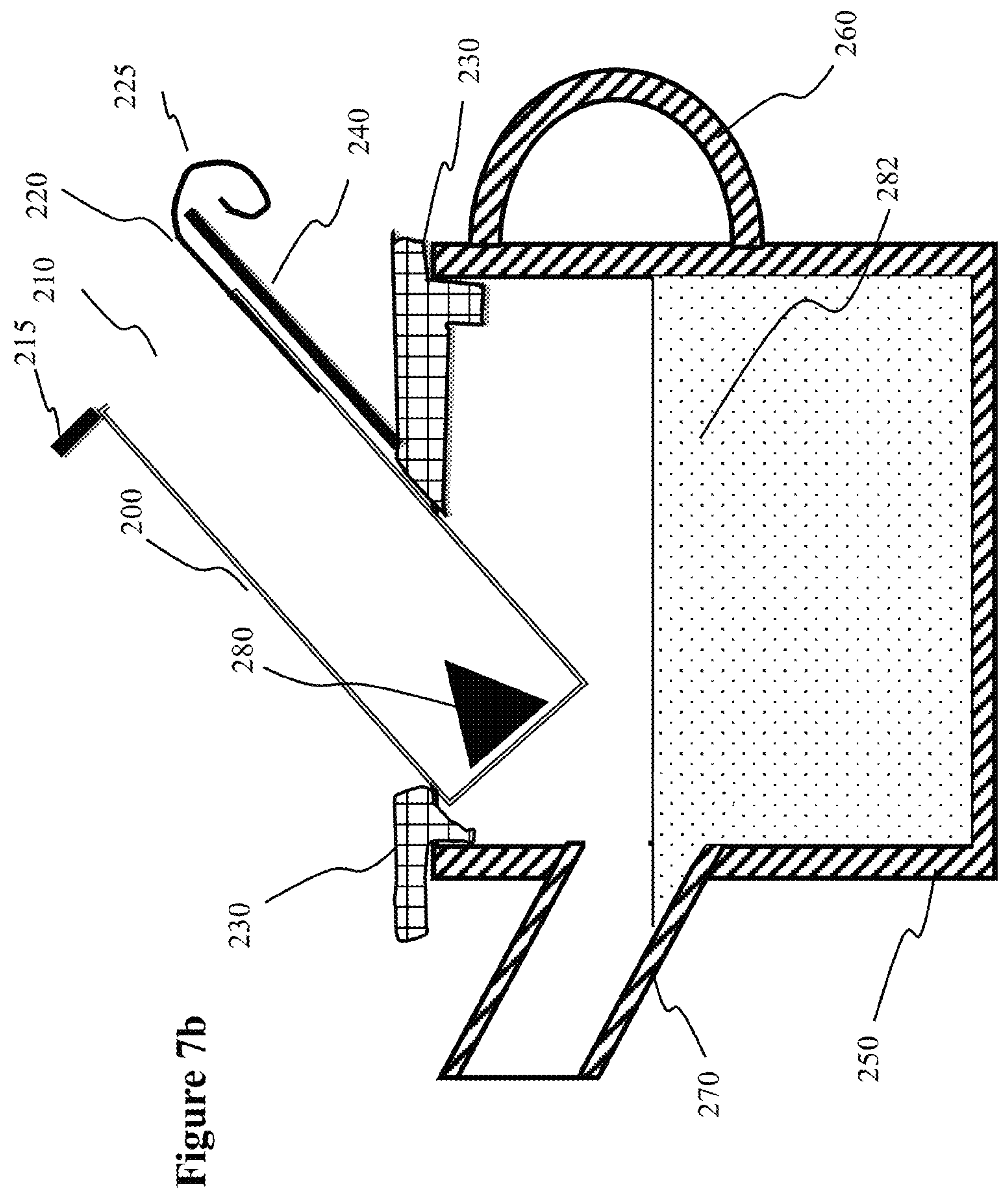

FIG. 7*a* and FIG. 7*b* show an apparatus according to the second preferred embodiment of the present invention, with infuser container 200 being placed in the higher stationary position. FIG. 7*a* is an oblique view of the apparatus, while FIG. 7*b* is a vertical cross section side view of the apparatus. Infuser 200 is lifted from base part 250 through top opening in cover part 230. Infuser container 200 is tilted and placed so that handle tip 225 of handle 220 engages with part support member 240 and lower end of infuser container 200 (the lower end being the end, which is opposite to opening 210), is partly inserted in cover part 230. Therefore, handle tip 225 acts as a hook, on which infuser 200 is hanging in a tilted position. In the tilted position infuser container 200 is at an angle to the vertical dimension with its top being moved away from nozzle 270: opening 210 and handle 220 are farther away from nozzle 270 than lower and middle sections of infuser container 200.

In the higher (or "upper") stationary position infuser 200 is located substantially above the level of liquid 282, so in that position infusible materials 280, which remain contained in infuser container 200, are separated from liquid 282 and the infusion process stops. The liquid, which may be remaining in infuser container 200, flows or drips back to base part 250.

Figure 7C:
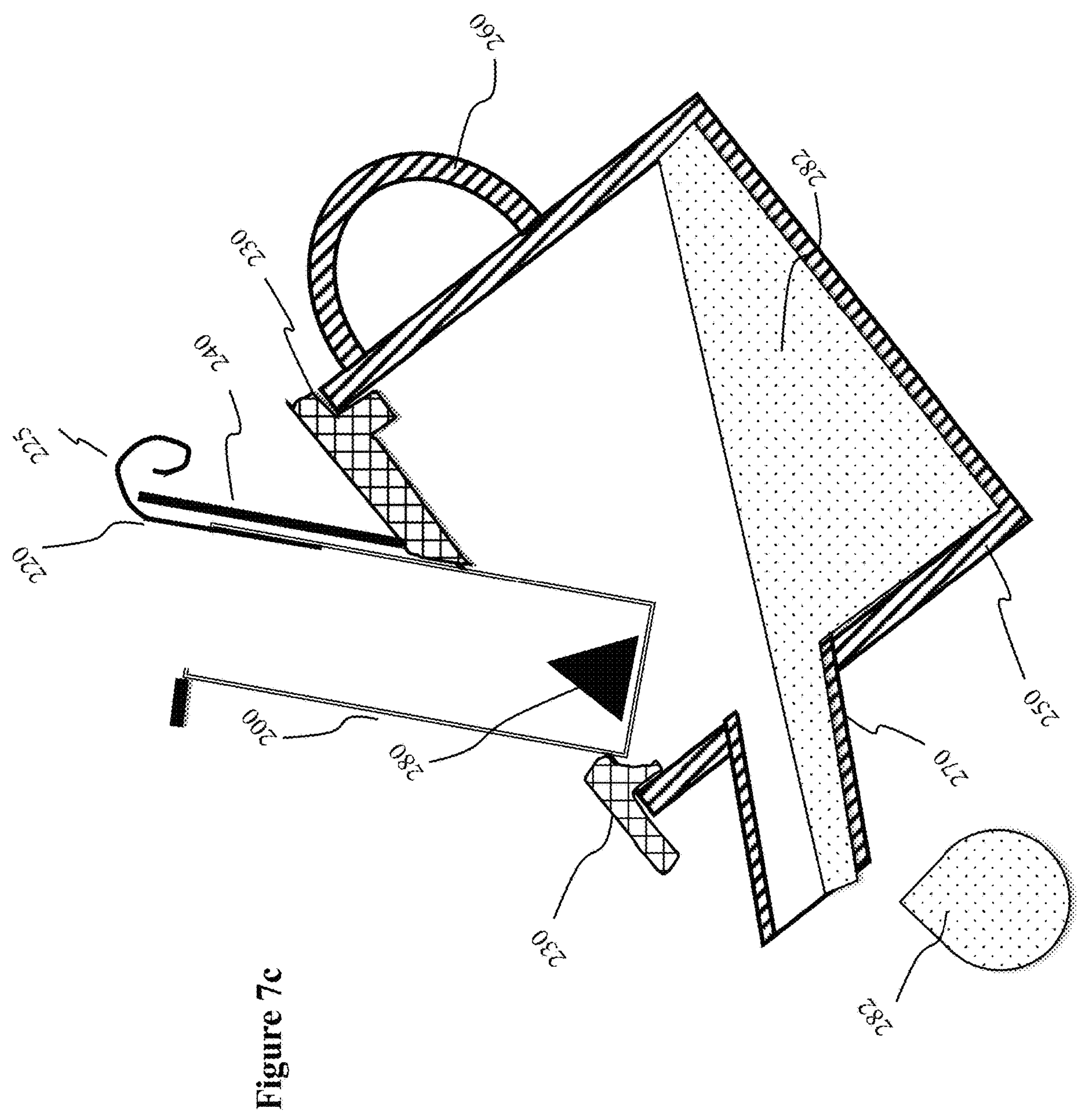
FIG. 7*c*: shows an apparatus according to the second embodiment of the present invention with an infuser container being in the higher stationary position; whole apparatus is being tilted to pour beverage from the beverage container.

FIG. 7*c* shows the apparatus according to the second embodiment of the present invention, when the apparatus is used for pouring beverage 282, produced by infusing infusible content 280 The user tilts entire apparatus, comprising infuser container 200, cover part 230, and base part 250, for instance, by grasping handle 260, so that the liquid starts pouring from nozzle 270. During the pouring the user does not need to remove infuser container 200 from the apparatus. Through handle tip 225 of handle 220, infuser container 200 is connected to (hanging on) support member 240, and movements of bottom part of infuser 200 are constrained by cover part 230, to which the bottom part is partly inserted. Therefore, when the apparatus is tilted and liquid 282 is poured through nozzle 270, infuser container 200 may securely move as a part of the apparatus, without getting loose and falling down.

Figures 8A, 8B:
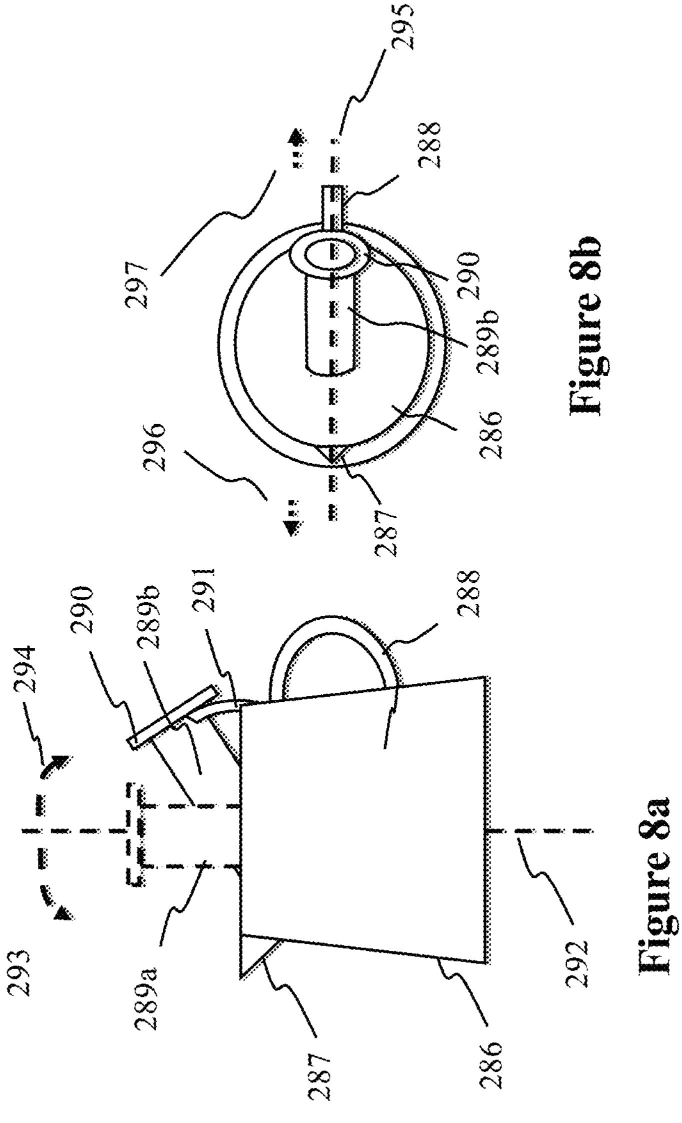
FIG. 8*a*: illustrates the relationship between the direction of pouring beverage and the direction of tilting an infuser container by showing a side view of an apparatus according to the second embodiment of the present invention with the infuser container being in the higher stationary position.
FIG. 8*b*: illustrates the relationship between the direction of pouring beverage and the direction of tilting an infuser container by showing a top view of an apparatus according to the second embodiment of the present invention with the infuser container being in the higher stationary position.

FIGS. 8*a* and 8*b* provide an illustration of how infuser containers according to the present invention are tilted relative to beverage containers when they are placed from a lower stationary position, in which they are oriented substantially vertically, to a higher stationary position. FIGS. 8*a* and 8*b* show an apparatus comprising a beverage container 286 and an infuser container 289. Beverage container 286 comprises a nozzle 287, a handle 288, and a support member 291. Infuser container 189 includes flanges 190. FIG. 8*a* shows a side view of the apparatus. It depicts infuser container 289 being lifted vertically (289*a*) and then tilted to assume a higher stationary position (289*b*). Infuser container 289 is tilted relative to a longitudinal vertical axis 292 in direction 294. When infuser container 289 is moved to the higher stationary position and is tilted in direction 294, flanges 290 move away from nozzle 287 and toward handle 288, which handle is placed on beverage container 286 substantially opposite nozzle 287. Tilting direction 294 is opposite to tilting direction 293, which is a direction of tilting, which needs to be carried out in order to pour beverage from beverage container 286. FIG. 8*b* shows a top view of the apparatus. It shows how, in the higher stationary position, infuser container 189 is oriented along a horizontal line 295, running from nozzle 287 substantially through the center of beverage container 286. When infuser container 289 is in the higher stationary position, flanges 290 are turned away from nozzle 287 in general direction 297 (toward handle 288, which handle is placed on beverage container 286 substantially opposite nozzle 287). Direction 297 is opposite to direction 296, which is the direction in which the apparatus must be moved to pour beverage from beverage container 286. Therefore, the higher stationary position is an elevated stationary tilted position, in which position the infuser container is tilted (or "rotated about a horizontal axis orthogonal to the central longitudinal axis of the infuser container") in a direction, which is substantially opposite to the direction, in which a tilting of the apparatus is to be performed in order to pour liquid from the beverage container.

In general, the second embodiment teaches an apparatus, wherein the infuser container and the beverage container are adapted to allow the infuser container to assume a higher stationary position by being lifted from a lower stationary position and tilted in a rotational direction, substantially opposite to the rotational direction in which the beverage container is supposed to be tilted to pour liquid from the container. The infuser container and the beverage container are configured to permit a secure attachment of the infuser container to the beverage container, which secure attachment keeps the infuser container in place when the beverage container is being tilted in order to pour a liquid from the container. Therefore, the secure attachment prevents the infuser container from falling down when pouring a liquid from said beverage container.

Furthermore, the second embodiment teaches a beverage container comprising an elevated support member, the infuser container and the elevated support member being configured to permit an engagement of the infuser container with the elevated support member, and this engagement permits keeping the infuser container in the higher stationary position. In particular, the infuser container and the beverage container are configured to permit the infuser container to assume a higher stationary position by being suspended on a top part of the elevated support member. The infuser container and the beverage container are also configured to constrain a movement of a bottom part of the infuser container when the infuser container is in the higher stationary position.

It is understood that having a nozzle or spout is not necessary for apparatuses according to the present invention. If an apparatus is configured so that an infuser container (a) can assume an elevated, higher stationary position (as described above), (b) in this elevated, higher stationary position it is tilted in a direction, which is opposite to a pouring direction, and (c) securely remains in the higher stationary position when beverage is poured from the apparatus, then the apparatus is within the scope of the first embodiment of the present invention, even if the apparatus does not have a spout or nozzle. In addition, infuser containers according to the present invention do not need to be tilted in a direction, which is precisely opposite the pouring direction. The direction can be approximately opposite (e.g., the angle between the directions can be 165 degrees rather than 180 degrees).

Figure 9:
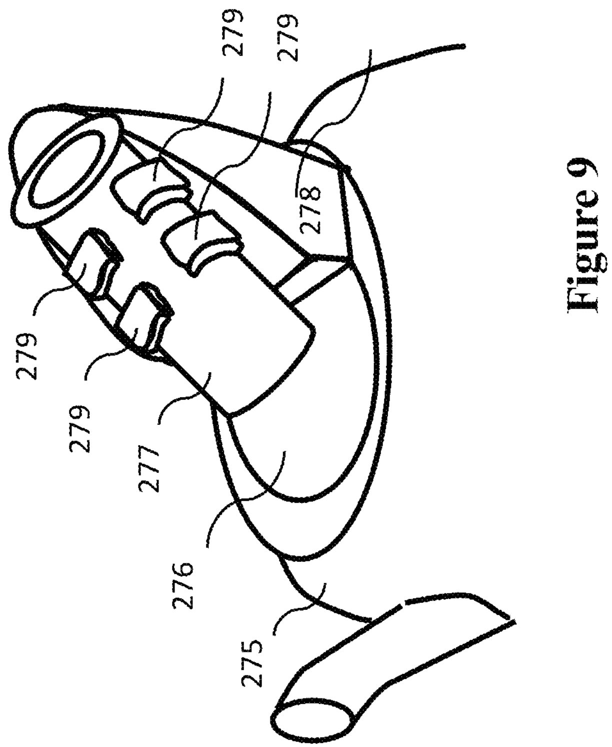
FIG. 9: shows a variation of the second embodiment of the invention.

Numerous other modifications of the second embodiment of the present invention are within the scope of the present invention. For instance, an infuser container can be attached to an elevated support member by other means than suspending the infuser container to a top part of the elevated support member. For instance, an elevated support member can comprise a holder/receptacle part, and an infuser container can be inserted into or snapped into the holder/receptacle. This solution is schematically illustrated by FIG. 9. FIG. 9 shows beverage container 275 having top opening 276 and elevated support member 278. Elevated support member 278 comprises protrusions 279, which protrusions collectively form a holder/receptacle holding infuser container 277. Infuser container 277 can be either inserted into protrusions 279 from above, or snapped into the space delimited by protrusions 279 by pressing infuser 277 against protrusions 279.

An apparatus can be configured so that an elevated support member, similar to support member 240, can be temporarily detached or folded by the user, for instance, during storage or transportation. For instance, an elevated support member, made of a metal wire resistant to bending, can be attached to the beverage container by snapping the member between appropriately shaped protrusions, or inserting it into appropriately located and sized holes. Attached in these ways, an elevated support member can also be easily removed. An elevated support member can also be made foldable when not in use, for instance by employing pivot joints for connecting the elevated support member to the beverage container base. In that case, the elevated support member can be folded by moving its top toward the nozzle.

A support member, similar to support member 240, can be attached to wall of a beverage container rather than to a lid, and an apparatus according to the second preferred embodiment may have no lid at all. In that case an infuser container may have wide flanges, substantially covering the top opening of the beverage container when the infuser container is in the lower stationary position. The shape, size, and material of the parts, including the infuser container (which, for instance, does not have to be cylindrical in shape), base part, cover part, support member, and handle, can be different. As mentioned, some of the parts (e.g., a nozzle) may not be present. Numerous additional parts, such as a permanent or detachable lid for the infuser container, can be added. An infuser container may assume a lower stationary position because it inserted in a beverage container until it reaches the bottom of the beverage container. In that case, in the lower stationary position, the infuser container rests on the beverage container bottom instead of being suspended and resting on flanges. The description of the preferred embodiment serves as an example, illustrating the teaching of the present invention. In general, the first preferred embodiment applies to all cases, in which a beverage container comprises an elevated support member, and an infuser container and the elevated support member are configured to permit a top part of the infuser container to securely engage (or "connect") with a top part of the elevated support member, and thus to permit the infuser container to hang (or "rest") on said elevated support member.

Figures 10A, 10B:
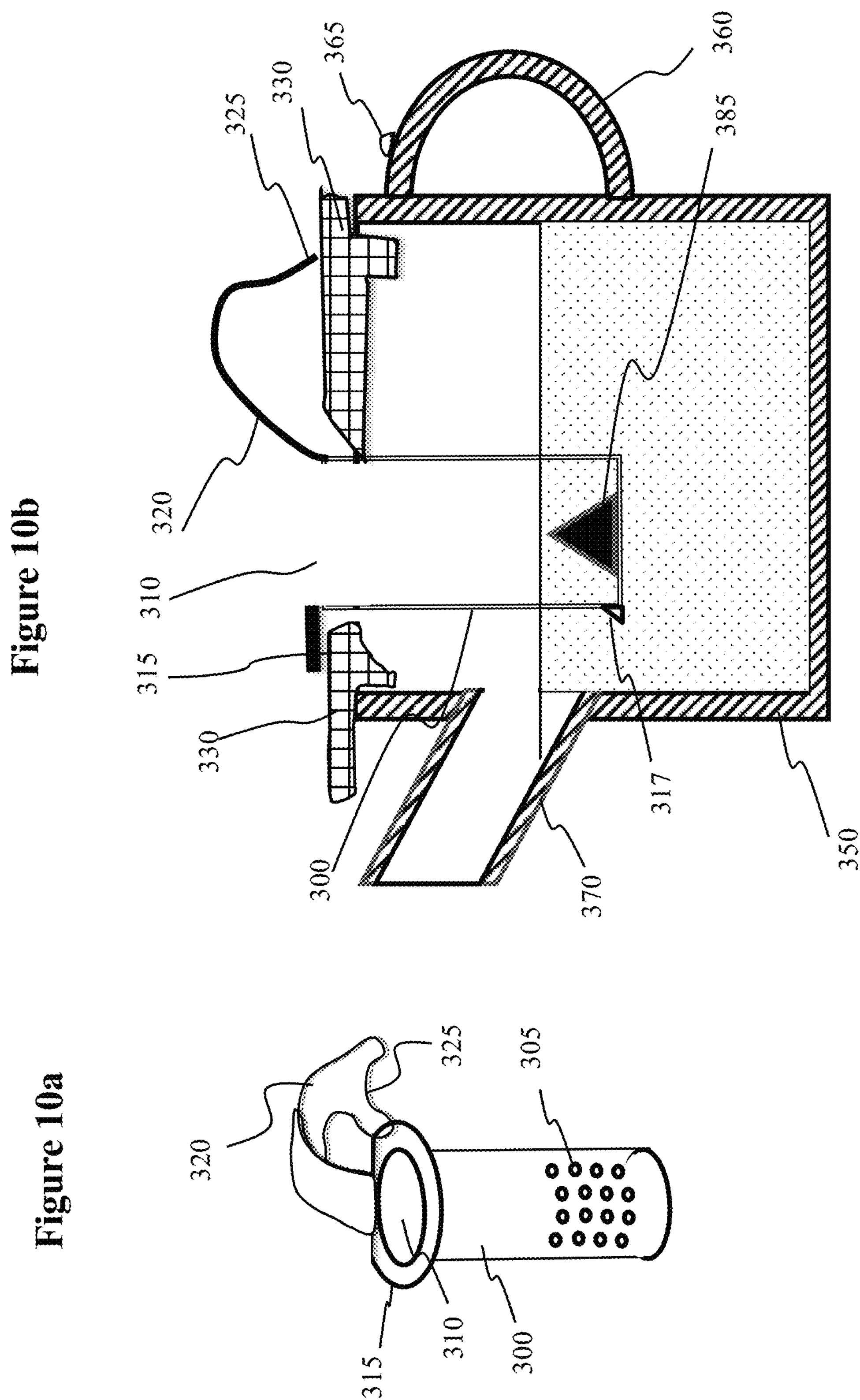
FIG. 10*a*: shows an infuser container of an apparatus according to the third embodiment of the present invention.
FIG. 10*b*: shows an apparatus according to the third embodiment of the present invention with an infuser container being in the lower stationary position.

FIGS. 10*a*-10*e* illustrate the third preferred embodiment of the invention. An apparatus according to the embodiment comprises three parts: infuser 300, cover part 330, and base part (also referred to as "base container") 350. Together, base part 350 and cover part 330 comprise the beverage container of the apparatus. Infuser container 300 has a long handle 320, ending with a wide forked tip 325 (FIG. 10*a*). Otherwise, it is similar to infuser container 200: it is also cylindrical in shape and has similar flanges 315, top opening 310, and perforations 305. Cover part 330 does not comprise a support member, but otherwise is similar to first embodiment's cover part 230.

FIG. 10*b* is a vertical cross section side view of an apparatus according to the second preferred embodiment of the present invention, with infuser container 300 being placed in the lower stationary position. Infuser 300 is inserted into base part 350 through an opening in cover part 330. Infuser container 300 has a protrusion 317 on the lower section, facing nozzle 370. Base part handle 360 has a protrusion 365 in its upper section. Infuser container handle 320 is extending above cover part 330. Flanges 315 rest on cover part 330, which prevents infuser container 300 from moving lower into base part 350. Infusible contents 385 can be placed into infuser container 300 through opening 310. If enough liquid is added to base part 350, infusible material 385 is submerged in the liquid and the infusion process is taking place.

Figure 10C:
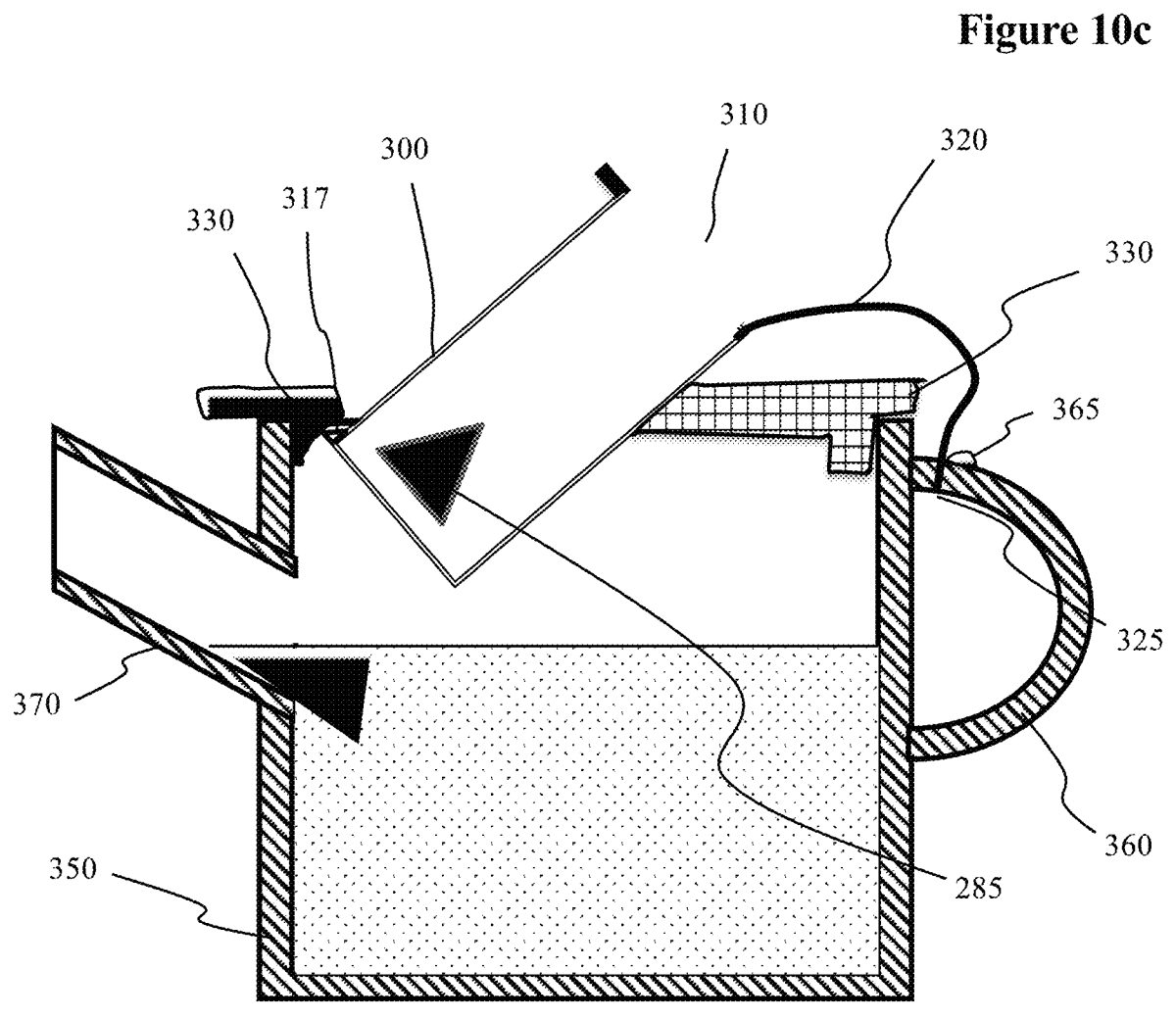

FIG. 10*c* is a vertical cross section side view of an apparatus according to the third preferred embodiment with infuser container 300 being placed in the higher, elevated stationary position. Infuser 300 is lifted from base part 350, tilted and placed so that handle tip 325 of infuser container 300 engages with handle 360 and presses against protrusion 365. The bottom part of infuser container 300 is constrained because it is partly inserted in cover part 330, and in addition, protrusion 317 presses against cover part 330 from below. Collaboratively, handle tip 325, handle 360 with protrusion 365, and protrusion 317 support infuser 300 in an elevated tilted position. In that position the top of infuser container 300 is directed away from nozzle 370: opening 310 and handle 320 are farther away from nozzle 270 than lower and middle parts of infuser container 300. When infuser container 300 is in the elevated tilted stationary position, the user may tilt the apparatus to pour beverage from it. When doing so, the user may press against handle tip 325, for instance, with the thumb of the same hand, or with another hand, to additionally secure infuser container 300 relative to cover part 330.

Figures 10D, 10E:
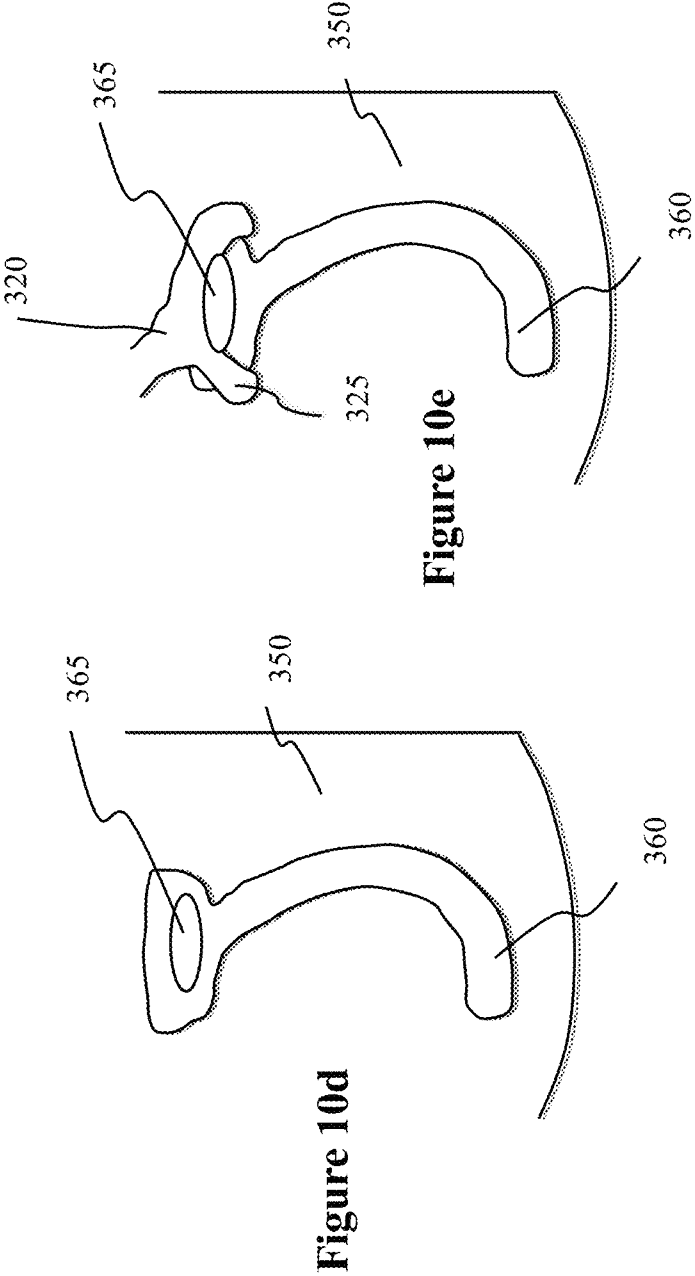
FIG. 10*d*: shows a handle of a beverage container according to the third embodiment of the present invention.
FIG. 10*e*: shows a handle of a beverage container and a part of a handle of an infuser container according to the third embodiment of the present invention.

FIGS. 10*d* and 10*e* provide a more detailed view of how handle 360 of base part 350 and protrusion 365 engage with handle tip 325 of handle 320.

In general the third embodiment refers to all cases when an infuser container comprises a handle support member connected to the infuser container in a proximity of the top opening of the infuser container, wherein the handle support member and the beverage container are configured to permit a free end of said handle support member (that is, a handle end, which is opposite to the end connected to the infuser container), to securely engage with said beverage container and thus permitting said infuser container to rest on said beverage container. The handle support member may be configured to enable the user to manually press the handle support member against the beverage container and thus achieve a more secure connection of the infuser container and the beverage container when the apparatus is tilted to pour beverage from the beverage container.

RAMIFICATIONS

Apparatuses according to the present invention can be used for preparing a wide variety of beverages, using various infusible materials (including black tea, green tea, white tea, rooibos tea, hibiscus tea, herbal tea, ground coffee, herbs, dried berries, and so forth) and various liquids.

Apparatuses according to the present invention can have various form factors and can be implemented as various products. For instance, they may or may not have beverage container nozzles, beverage container spouts, beverage container handles facilitating lifting and tilting said apparatus, infuser container flanges limiting an insertion of an infuser container into a beverage container, infuser container handles facilitating extracting an infuser container from a beverage container, beverage container lids covering a beverage container top opening, and infuser container lids covering an infuser container top opening. In particular, infuser containers can have various types of lids, including snap on, twist on, and flip lids. The apparatuses may or may not be implemented as electric kettles. They can be made of various materials, for instance, glass, metal, porcelain, clay, plastic, or of a combination of different materials. Liquid permeability of infuser containers can be achieved by using perforation holes, metal or plastic mesh, fabrics attached to rigid frames, and so forth. The shape of an infuser container may be other than cylindrical, e.g., it may be oval, triangular, or square-shaped in cross-section. An infuser container may or may not have handles and flanges. A base part and a cover part can be connected/disconnected in various ways (snap on, twist on, hinges, lock-type connectors, etc.). A supporting part can be integrated with a cover part or implemented as a separate part, which can be attached to a cover part.

In particular, various types of connecting an infuser container to a cover part can be employed. For instance, while in the second preferred embodiment it is achieved by using a hook-shaped handle tip, other connection types are also possible, such as a snap-on connection of an infuser container and a concave supporting surface, or using flanges that are configured to engage with a supporting part when an infuser container is rotated about its central longitudinal axis.

Additionally, it is understood that the scope of the present invention extends to apparatuses, which use a variety of existing vessels as beverage containers. In other words, consumer products implementing the invention may not include a beverage container; instead, they may allow the user himself or herself to choose a beverage container (e.g., a jar). For instance, when manufactured or sold, such products may only include a cover part and an infuser container.

All these embodiments, as well as their variations, obvious to those skilled in the art, are within the scope of the present invention, which is generally defined as an apparatus for making beverages by way of immersing an infusible material in a liquid, said apparatus comprising at least:

an infuser container, said infuser container having a top opening, wherein at least a part of a body of said infuser container being liquid-permeable, said liquid-permeable body being impermeable to said infusible material; and a beverage container, said beverage container being a liquid-impermeable container comprising at least walls and a bottom, said beverage container having a top opening configured to permit inserting said infuser container to said beverage container and extracting said infuser container from said beverage container; and wherein said beverage container and said infuser container are configured to support said infuser container in an elevated tilted stationary position when said apparatus is in an upright position, wherein in said elevated stationary position said infuser container is placed substantially above a liquid contained in said beverage container and said infuser container is oriented to contain said infusible material inside said infuser container.

In addition, the present invention teaches an infuser container and a beverage container being configured to permit said infuser container to be securely attached (or "connected") to said beverage container when said beverage container is being tilted in order to pour a liquid from said beverage container, whereby said secure attachment (or "connection") prevents said infuser container from falling down or spilling its content.

What is claimed is:

1. An apparatus for making beverages by immersing an infusible material in a liquid, said apparatus comprising at least:

a detachable infuser container comprising a body having a bottom, walls, a top opening, and a handle extending from a region near said top opening; wherein said body is impermeable to said infusible material and wherein at least a portion of said body is liquid-permeable;

a substantially rigid liquid-impermeable beverage container comprising an elevated support structure, walls, a bottom, and a top opening;

wherein said infuser container is positionable in a first, lower stationary position in which said infuser container is inserted at least partially into said beverage container through said top opening of said beverage container, said infuser container is substantially vertically oriented, and said infusible material is immersed in liquid contained in said beverage container;

wherein said infuser container is movable from said lower stationary position into a higher stationary position by lifting said infuser container and tilting said infuser container such that a top portion of said infuser container is located on a side of said beverage container substantially opposite to a pouring direction of said beverage container; wherein said handle of said infuser container engages with said support structure on said beverage container to maintain said infuser container in said higher stationary position, said bottom of said infuser container and said opening of said beverage container are substantially vertically aligned with each other and said bottom of said infuser container is constrained by being partially inserted in said top opening of said beverage container.

2. An apparatus of claim 1, wherein said elevated support member is concave.

3. An apparatus of claim 1, wherein said beverage container comprises a lid and wherein said elevated support member is attached to said lid.

4. An apparatus of claim 1, wherein said infuser container additionally comprises at least a member selected from a group of members comprising an infuser container lid covering an infuser container top opening, and a protrusion or protrusions constraining a movement of said infuser container within said beverage container.

5. An apparatus of claim 1, wherein said beverage container additionally comprises at least a member selected from a group of members comprising at least a beverage container nozzle, a beverage container spout, a beverage container handle facilitating lifting and tilting said apparatus, and a beverage container lid covering a beverage container top opening.

* * * * *